April 21, 1936.　　　　　G. A. NEW　　　　　2,037,996
SAND FINISH HARD SURFACE ACOUSTICAL PLASTER
Filed April 22, 1933
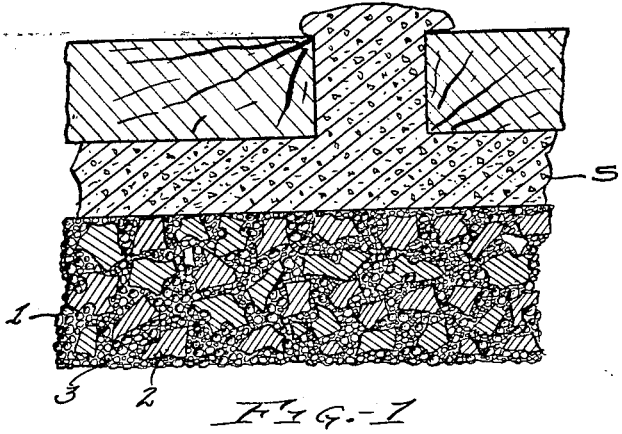
Fig. 1 — *Newly applied*
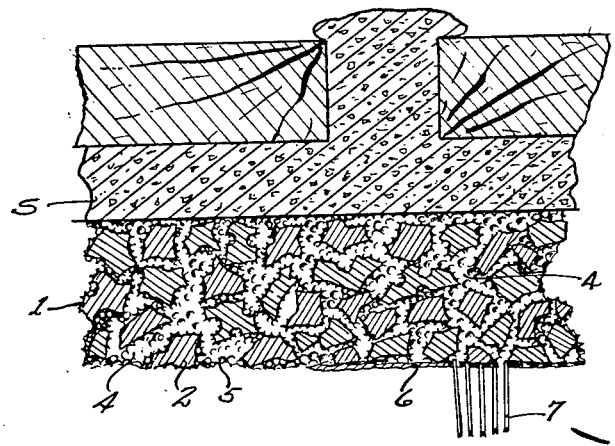
Fig. 2 — *after setting and hardening* — *stippling brush*
INVENTOR
Gustave A. New
BY Soule v Leonard
ATTORNEYS Patented Apr. 21, 1936

2,037,996

UNITED STATES PATENT OFFICE 2,037,996

SAND FINISH HARD SURFACE ACOUSTICAL PLASTER

Gustave Adolph New, Cleveland, Ohio, assignor to John E. Rooney, Cleveland, Ohio Application April 22, 1933, Serial No. 667,467

5 Claims. (Cl. 106—34)

This invention relates to an improvement in acoustical plasters, its primary object being the production of a highly efficient acoustical plaster composition at an extremely low cost.

Another equally important object is to produce a plaster composition of this character which has as its essential characteristic uniformity of quality, a high degree of lightness and plasticity, efficiency and ease of spread and workability as well as maximum coverage and which, when applied, will set and dry readily to form a finished product which is strong, durable and stable, homogeneous and of uniform characteristics throughout.

A correlative object is to produce an acoustical plaster, which has these and other desirable qualities even when mixed for application at the building site under the widely varying range of conditions encountered in commercial use, and applied with the usual hand troweling methods by workmen of only average skill.

Other objects and advantages will become apparent from the following specification wherein is described by reference to the drawing, both a preferred mixture of ingredients forming the composition, some of the more readily obtainable materials which may be used if extreme conditions so require, and also the manner in which the individual ingredients cooperate with the mass to produce the desired results.

In the drawing:

Fig. 1 is a somewhat diagrammatic illustration showing a wall section with the newly applied plaster thereon.

Fig. 2 is a similar illustration showing the plaster after setting and hardening.

Heretofore comparable acoustical characteristics have been obtained by plaster compositions compounded, mixed and applied under the ideal conditions of the laboratory or on the work bench but these compositions have failed to effect or even to approximate closely the same results and characteristics when mixed and applied under practical field conditions.

By exhaustive tests it appears to be established that sound absorption is directly dependent upon entrapping sound waves of the various frequencies and converting the energy of the waves into a different and inaudible form of energy while so entrapped and without reflecting the sound waves out from the entrapping medium.

In order to accomplish this result, I provide a plaster composition which, when mixed and applied by troweling and allowed to set and dry, results in a product characterized by a vast number of closely spaced passages of uniform size opening onto the outer exposed surface of the product, and also an equally vast member of internal passages of uniform size intercommunicating with each other and with the first passages internally of the mass. The passages are uniformly distributed throughout the mass and intersect each other at numerous different angles so that the sound waves entering the first passage may pass well into the mass and there be diverted in whole or part into internal intersection passages and thereby divided and reverberated against the walls of the internal passages without returning to a noticeable extent out from the first passages wherein they entered.

The passages which I provide are not to be confused with mere surface cavities, such as formed by stippling, or in other known manners, or with cells existing in the aggregate utilized, all of which terminate interiorly of the mass in comparatively hard sound reflecting end walls, nor are they to be confused with occluded bubbles or cells in the mass which are isolated to a great extent from each other and communicate neither with an appreciable number of adjacent cells nor with the outside atmosphere. Such cells, while effective for thermal insulation and for providing cavities or pockets as above described either fail to receive the sound waves or, having received them, reflect them back out of the mass in such slightly impaired condition that they are clearly audible.

Not only is it desirable to provide intercommunicating passages, but also, as stated in the objects, it is desirable that the plaster be such that it is capable of being mixed easily and applied by hand troweling, that it will have a high degree of plasticity and spread readily so as to cover a large area per unit weight, and that it will be light yet will form a strong and durable product which is homogeneous and very stable under extreme temperature, moisture and other weather conditions.

The plaster composition of the present invention has these desirable qualities, the spread averaging 175 square yards per ton of mix when applied one-half inch in thickness, a spread or coverage not heretofore obtained by any other so-called accoustical plasters.

A plaster composition suitable for accomplishing all of these results may comprise the following ingredients in the proportions described, it being noted that the ingredients are not affected chemically by each other nor does any one result in or maintain a condition harmful to the others. All chemical reactions effected are between certain of the ingredients and the water added for mixing which, since it later evaporates to great extent, is not recited as an element of the composition itself.

The preferred composition, comprising the following ingredients in the noted amounts by weight, illustrates a suitable mix of substantially one ton, the proportions being the same for mixes of any desired amount:

| | | Pounds |
|---|---|---|
| (a) | Stucco | about 750 |
| (b) | Vermiculite (expanded state) | about 750 |
| (c) | Asbestos shorts | 300 |
| (d) | Slag filler | 200 |
| (e) | Soap bark | 20 |
| (f) | Retarder | 4 |

This composition is mixed with sufficient water to render it readily workable as in the usual types of plasters and is spread in the usual manner on the usual plaster base coat S on the wall surface, which base coat S, for the purposes of brevity herein, is considered as part of the wall.

The ingredients and amounts specified may be varied within reasonable limits to counteract variations in the quality of the ingredients, and to meet the acoustical effects desired.

The above composition of ingredients, in the proportions given, when applied in the field by hand troweling, as a layer, designated generally as 1, one half inch in thickness, and allowed to dry, will provide a finished product comparable in appearance to the ordinary sand finish plasters, and having an acoustical coefficient of from 50 to 65% for sounds having a frequency of 512 cycles per second.

In order to illustrate the manner in which variations in the finished product may be accomplished, and as a guide for accomplishing a particular degree of sound absorption, the characteristics, effects and contributions to the whole of each material is now to be discussed.

The stucco used is preferably a high quality gypsum containing about 5% water of crystallization, and 90% of calcium sulphate, finely and uniformly comminuted, and having a tensile strength of about 250 pounds per square inch. Though 750 pounds is preferred, the amount used may be varied between the limits of 900 to 600 pounds in a one ton mix, an increase over the preferred amount decreasing the spread and reducing the acoustical coefficient by virtue of increasing the surface tension of the mix as will later be explained. Other cementitious materials have disadvantages rendering them far less effective, animal and vegetable glues deteriorating with age and use, and Portland cements having the disadvantages of greater weight, less spread and greater unit cost.

The light or expanded fillers, such as the expanded Zonolite or vermiculite, are extremely light, weighing about eight pounds per cubic foot, and, in the expanded condition, contain in themselves a large number of voids assisting in sound absorption but primarily useful for their thermal insulation value and in decreasing the weight of the mass. Such fillers impart to the composition a high degree of spread and may be varied between 750 and 400 pounds per ton mix, an increase over the preferred limit decreasing workability and a decrease shortening the spread and causing an increase in density of the mass which as later explained, results in a lower acoustical coefficient. Vermiculite and slag may be substituted for each other to a certain extent. For instance, if vermiculite is cut to the lower limit of 400 lbs. the slag may be proportionately increased to about 600 pounds.

The more available fillers such as rock or mineral wool, granulated cork and such are effective in varying degrees but have disadvantages rendering them less desirable, not the least of which is their much greater cost.

Asbestos shorts are preferred to talc or plastic clays as the shorts are less expensive and provide a higher degree of slip and plasticity. This ingredient also may be used effectively between the limits of 250 to 125 lbs. per ton, having in mind that an undue increase thereof will render the composition mushy and also will retard drying, while a decrease in the amount thereof results in a decrease in slip.

The slag is used primarily as a filler and is exceedingly light in proportion to its strength. Granulated intumesced slag commonly referred to as "popcorn" slag that has been crushed and screened so that only the light hard particles remain, is preferred, as the too highly intumesced portions would tend to crush under trowel pressure and form a white powder resulting in light streaks in the finished plaster surface. While the slag contains numerous voids and air cells which add to the thermal qualities of the mix, such have only a slight effect on the acoustical properties and the slag is not directly depended on for this purpose. Its light weight, however, renders the foaming agent more effective.

The soap bark, by virtue of its foaming and air entraining effect when combining with water, increases the slip and spread of the mass as it renders the mass extremely bulky in proportion to its weight. If such a high degree of spread and slip is not desired, the soap bark may be cut as low as 5 pounds per ton. It is introduced in the dry composition in finely powdered form and all particles are uniform in effect and thus render the finished mass very uniform in porosity throughout. A gassing agent, such as described in my Letters Patent of the United States, No. 1,745,635, issued February 4, 1930 may be substituted for soap bark with effective results. Other gassing agents may be used, for instance, an acid salt such as aluminum sulphate plus a carbonaceous salt such as sodium bi-carbonate, the two being mixed in equal parts. For the exemplary mass above specified about 80 pounds of such gassing agent would be used and the soap bark preferably dispensed with in such case. If a gassing agent is used the mass is applied while the agent is active.

Throughout the claims the word "gases" has been used in its more general sense to include both gases by such an agent or air, which latter, of course, is composed of numerous gases.

As stated above, a layer of this composition, troweled in place, and being one half inch in thickness will have an acoustical coefficient of 50 to 65% within the frequencies specified. An increase and a decrease in the thickness, other factors remaining constant, respectively increases and decreases the acoustical coefficient in about a direct proportional relationship between the limits of 65% and 30%. Outside of these limits, the change in the coefficient for a given change in thickness is less pronounced.

The manner in which such a vast number of uniform and evenly distributed intercommunicating passages, part of which open onto the exposed surface of the plaster, are produced, is by maintaining a proper ratio among the characteristics of weight of the mix, the degree of gassing or foaming and entraining of gas or air, hardness, and surface tension of the stucco. This balance is difficult to obtain by the use of other various mineral foaming agents. Not only are such expensive but are otherwise undesirable as in commercial form they vary greatly in quality and fineness and the resultant amount of gas given off. Consequently, they would result in unduly variegated sizes of passages. Furthermore, they may tend to react chemically with other ingredients of the mix instead of reacting only with the water. In commercial forms, the disadvantages of such minerals are further augmented by changes and partial recrystallization when stored under any but the most ideal conditions. The finely powdered soap bark does not have these disadvantages and is used instead.

It should be noted that the proportion of stucco used is comparatively low and that the fillers and other ingredients used are light in weight. In addition to the advantages inherent in handling, shipping, mixing and applying such a light weight plaster, this lightness has a marked effect upon the final results produced by the foaming or entraining agent. When the foaming agent becomes wet during mixing a comparatively large amount of gas or air bubbles are entrained, and, since the mass is light in weight and a vast number of gas or air pockets are partially confined in the mass by the stucco, the entire mass rises and expands freely and comparatively evenly and for the time being remains in the intumescent state. The gases are not compressed unduly by the mass itself so as to form a few very large relief passages. The setting may be sufficiently retarded so that the foaming agent is active while the plaster is spread and setting. Due to the light weight of the mix, a light troweling pressure which will not expel the gases or air is sufficient to apply the plaster and provide sufficient suction to hold it firmly in place. The strong slag aggregate engaging the surface to which the plaster is applied also prevents undue compression of the plaster by the troweling operation and resultant expulsion of the gases or air during application.

The mass when applied and partially set is illustrated in Fig. 1 wherein the particles 2 of the various aggregate are distributed throughout a mass of binder which is characterized by being evenly intumescent, containing numerous bubbles 3 of entrained gas or air.

Since the proportion of stucco is comparatively low, its surface tension is weak and may be broken easily before the mass has hardened. In fact, it is so proportioned that upon heating of the mass due to the frictional heat generated by recrystallization of the stucco, the occluded air cells or gases become heated and expand sufficiently to burst their weak confining walls or surface films so that, what were formerly air or gas cells become intercommunicating passages extending in all directions, and criss-crossing throughout the finished product for its full thickness.

In Fig. 2 is illustrated the mass after the bubbles have burst, the particles 2 of slag or filler being well distributed throughout the mass, and the bubbles, throughout the mass and surrounding the particles of aggregate, having burst so as to form intercommunicating passages 4 many of which open onto the outer exposed surfaces of the mass, as indicated at 5.

Since a vast number of these passages open onto the outer surface of the finished product, the sound waves may enter freely and, due to the intercommunicating internal passages, the waves are divided and subdivided and reverberated against the walls of the internal passages to such an extent that they are dissipated beyond the degree at which they would deleteriously affect audibility within the room or compartment from which they first emanated.

If extreme hardness of the exposed surface of the finished acoustic product is desired, the surface may be coated with a very thin film of hard wall plaster, such as lime putty, Keene's or Portland cement, such film being indicated at 6 in Fig. 2. Such a film renders the surface washable without deleterious results. In order not to destroy the acoustical effect, the surface so covered may be stippled with an ordinary stippling brush 7 to form passages 8 which will communicate with the passages 4 heretofore described. Such a hard surface may likewise be spray painted with a waterproof paint without losing its sound absorbing qualities, as sprayed paint enters the passages in the surfaces for only a slight distance and does not form a surface film across and seal the openings as does paint brushed across the surface.

While I have described a composition embodying a preferred form of my invention, it is illustrative only, and the features and characteristics desired, though obtained by other ingredients acting in like manner to those described or ingredients effecting the same result, are meant to be included within the scope of my invention, as also is the resulting product, even though produced in a different manner.

Having thus described my invention, I claim:

1. A dry mix composition that upon gaging with water forms a plastic mass capable of being applied by troweling and that sets to form a product having a high coefficient of sound absorption, comprising substantially, by weight, 900 to 600 parts of stucco, 300 to 250 parts of asbestos shorts, 250 to 100 parts of an expanded lithic filler of rough contour, 25 to 15 parts of soap bark, 3½ to 4½ parts of a retarding agent.

2. A dry mix composition that on gaging with water forms a plastic mass capable of being applied by troweling and that sets to form a product having a high coefficient of sound absorption, comprising substantially, by weight, 750 parts of gypsum stucco, 750 parts of a light expanded inert filler, 300 parts of asbestos shorts, 200 parts of a hard expanded slag filler, 20 parts of soap bark and 4 parts of a suitable retarding agent.

3. A dry mix composition that on gaging with water forms a plastic mass capable of being applied by troweling and that sets to form a product having a high coefficient of sound absorption comprising substantially equal parts of calcium sulphate and a light expanded lithic material, to which is added asbestos shorts in the amount of one part to about two parts of calcium sulphate, hard intumesced granulated lithic material in the amount of one part to about four parts of calcium sulphate, an entraining agent of saponin type in the amount of 0.10 parts to one part of calcium sulphate and a small amount of retarder.

4. A dry mix composition that on gaging with water forms a plastic mass capable of being applied by troweling and that sets to form a plaster having a high coefficient of sound absorption comprising substantially by weight, stucco 900 to 600 parts, asbestos shorts 300 to 250 parts, an expanded lithic filler of rough contour 250 to 150 parts, a gassing agent 85 to 75 parts and a retarder.

5. A dry mix composition that on gaging with water forms a plastic mass capable of being applied by troweling and that sets to form a plaster having a high coefficient of sound absorption comprising substantially by weight, a gypsum stucco, 750 parts; a light expanded inert filler, 750 parts; asbestos shorts, 300 parts; a hard expanded slag filler, 200 parts; a gassing agent, 80 parts; and a retarder.

GUSTAVE ADOLPH NEW.